(12) United States Patent
Fujita et al.

(10) Patent No.: US 6,422,534 B1
(45) Date of Patent: Jul. 23, 2002

(54) CURRENT-CARRYING DEVICE FOR MOTOR

(75) Inventors: Youichi Fujita; Sotsuo Miyoshi; Toshihiko Miyake; Satoshi Kawamura, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/050,715

(22) Filed: Jan. 18, 2002

Related U.S. Application Data

(63) Continuation of application No. 09/904,555, filed on Jul. 16, 2001, now Pat. No. 6,357,425, which is a continuation of application No. PCT/JP99/06458, filed on Nov. 18, 1999.

(51) Int. Cl.[7] .......................... H02K 7/14; H02K 13/00; F02M 25/07
(52) U.S. Cl. ................ 251/129.11; 310/71; 123/568.21
(58) Field of Search ................ 251/129.11, 129.12, 251/129.13, 129.06; 310/68, 71, 127, 137, 143, 148, 219, 238, 239, 242, 249; 123/568.21

(56) References Cited

U.S. PATENT DOCUMENTS 4,398,135 A * 8/1983 Bush et al.
5,688,160 A * 11/1997 Pozzetti et al.
2001/0048252 A1 * 12/2001 Fujita et al.
2001/0050346 A1 * 12/2001 Fujita et al.

FOREIGN PATENT DOCUMENTS

| JP | 03-74162 U | * | 7/1991 |
| JP | 07-194051 A | * | 7/1995 |
| JP | 07-322559 A | * | 12/1995 |
| JP | 10-122059 A | * | 5/1998 |

* cited by examiner

Primary Examiner—Andrew M. Dolinar
Assistant Examiner—Arnold Castro
(74) Attorney, Agent, or Firm—Sughrue Mion, PLLC

(57) ABSTRACT

A power supply motor brushes 25 for a current carrying device is arranged in a sensor power supplying unit 21 with a sensor. This allows connecting terminals 5 of the sensor power supplying unit 1 and receiving connectors 7 of a DC motor unit 6, which are arranged in proximity to motor brushes 9 of the DC motor unit 6 and which are connected to the connecting terminals 5, to be dispensed with. These components are required in a conventional device in order to supply a current from a power supply terminal 2 to the motor brushes 9.

6 Claims, 7 Drawing Sheets

CURRENT-CARRYING DEVICE FOR MOTOR

CROSS-REFERENCE TO THE RELATED APPLICATION

This is a continuation of application Ser. No. 09/904,555, filed Jul. 16, 2001, now U.S. Pat. No. 6,357,425 which is a Continuation Application of PCT Application No. PCT/JP99/06458, filed Nov. 18, 1999, the above noted prior applications are all hereby incorporated by reference, the international application is claimed was not published under PCT Article 21(2) in English.

BACKGROUND OF THE INVENTION

1. Field of the Invention

The present invention relates to a current-carrying device for an EGR (Exhaust Gas Recirculation) valve device comprising for example a recycling system for exhaust gases.

2. Description of Related Art

Conventionally an EGR valve device has been used with a step motor to open and close valves. However use of a DC motor unit instead of a step motor has developed in order to avoid reductions in reliability, response characteristics and limits in the resolution of valve aperture regulation. FIG. 1 is a partial perspective view of a current carrying device of a conventional EGR valve device. FIG. 2 is a partial cross sectional view of a sensor power supplying unit 1 shown in FIG. 1. This type of EGR valve device uses a DC motor unit to drive valves. In FIG. 1, reference numeral 1 denotes a sensor power supplying unit which supplies power to a direct current(DC) motor and a sensor. A valve position is detected by the sensor. 2 denotes a power supply terminal which comprises a motor power supply terminal for supply of power to the DC motor unit and a sensor power supplying unit terminal for supply of power to the sensor in order to detect valve position. 3 denotes a power supply terminal cover which covers the power supply terminal 2. 4 denotes a concave portion formed in an abutting face 1a with the sensor power supplying unit 1 on the DC motor unit side. 5 denotes a connecting terminal for connecting the motor power supply terminal of the power supply terminal 2 to the DC motor unit. The connecting terminal 5 is formed in the concave portion 4.

6 denotes a DC motor unit. 7 denotes each of a plurality of receiving connectors formed on the DC motor unit 6 of a position at which the receiving connector 7 can be tightly engaged with the connecting terminal 5. 8 denotes each of a plurality of motor brush pressing plate springs, which are connected with the receiving connectors 7. 9 denotes each of a plurality of motor brushes. Each motor brush 9 is fixed to one face of the tip of the motor brush pressing plate spring 8 and is connected to a motor power supply terminal 2b discussed below. 10 denotes a disk-shaped feeding unit which comprises a plurality of commutator pieces and a plurality of slip rings. The disk-shaped feeding unit 10 is arranged in the DC motor unit 6 and rotates together with a rotor (not shown) of the DC motor unit 6.

In FIG. 2, reference numeral 2a denotes a sensor power supplying unit terminal and sensor signal output terminal, and 2b is a motor power supply terminal. 11 denotes a sensor for detecting valve position.

FIGS. 3A and 3B show a current carrying device in a conventional EGR valve device which comprises coils of the stator and which has a disk-shaped feeding unit which comprises the commutator pieces and the slip rings. In FIGS. 3A and 3B, those components which are the same or similar to those shown in FIG. 2 are denoted by the same numerals and additional description will be omitted. Each motor brush 9 which is fixed to the motor brush pressing plate spring 8 is connected electrically with the motor power supply terminal 2b through a connecting terminal 5 and the receiving terminal 7.

10 denotes the disk-shaped feeding unit which comprises the commutator pieces 15 and the slip rings 16 formed in a concentric shape on its surface. 13 denotes each of a plurality of motor brushes, 12 denotes each of a plurality of motor brush pressing plate spring members. Each motor brush 13 is tightly fitted to one tip surface of one motor brush pressing plate spring member 12. A DC current is supplied from the motor power supply terminal 2b to each motor brush 13 through one motor brush 9, and a DC current commutated by one commutator piece 15 of the disk-shaped feeding unit 10 is supplied to the coil of the stator through the motor brush 13. The motor brush pressing plate spring members 8, to which the motor brushes 9 are tightly fitted, and the motor brush pressing plate spring members 12, to which the motor brushes 13 are tightly fitted, are arranged on the periphery of the disk-shaped feeding unit 10 so as to be electrically insulated from each other. The motor brush pressing plate spring member 8 and the motor brush pressing plate spring members 12 extend from above the disk-shaped feeding unit 10 to fixed positions on the slip rings 16 or the commutator pieces 15 formed on the surface of the disk-shaped feeding unit 10 and pushes the motor brushes 9, 13 tightly fitted on the tip onto the surfaces of the slip rings 16 or the commutator pieces 15. Therefore, the motor brush pressing plate spring member 8 press the motor brushes 9 so as to make the motor brushes 9 slide on the surfaces of the commutator pieces 15, and the motor brush pressing plate spring members 12 press the motor brushes 13 so as to make the motor brushes 13 slide on the surfaces of the slip rings 16.

The operation of the current carrying device of the conventional EGR valve device will be described below.

In this type of EGR valve device, the sensor power supplying unit 1 abuts with the upper end of the DC motor unit 6. Abutment is required in order for the connecting terminal 5 in the concave portion 4 formed on the abutting face 1a on the power supply 1 of the DC motor unit 6 to make the connecting terminal 5 tightly engage with the receiving connector 7. As a result, the motor power supply terminal 2b of the sensor power supplying unit 1 is electrically connected with one commutator piece 15 of the disk-shaped feeding unit 10 of the DC motor unit 6.

The sensor 11 detects the position of a valve (not shown) which is formed on the side of the DC motor unit 6 and outputs a signal from the sensor signal output terminal 2a as an electrical signal.

Since the current carrying device of the conventional EGR valve device is comprised as above, it is necessary for the connecting terminal 5 of the sensor power supplying unit 1 to tightly engage with the receiving connector 6 of the DC motor unit 6 in order to assemble the sensor power supplying unit 1 with the DC motor unit 6. Thus it is difficult to complete the assembly operations of the sensor power supplying unit 1 and the DC motor unit 6 in a short time. Furthermore the problem has arisen that the structure of the current carrying device is complicated by the necessity to provide the connecting terminal 5 of the sensor power supplying unit 1 and to provide the receiving connector 7 of the DC motor unit 6.

SUMMARY OF THE INVENTION

The present invention is provided to solve the above-described problem, and the object of the present invention is to provide a current carrying device for an EGR valve device which facilitates assembly operations of the sensor power supplying unit and the DC motor unit and which simplifies the current carrying structure for the DC motor unit.

A current carrying device for an EGR valve device according to the present invention comprises a plurality of power supply motor brushes assembled on a sensor power supplying unit so as to connect each power supply motor brush with a power supply terminal of the sensor power supplying unit and to make each power supply motor brush be in contact with a commutator piece of a feeding unit arranged in the DC motor unit, and a plurality of coil feeding unit motor brushes, each of which is in contact with a slip ring of the feeding unit, for respectively supplying a current, which is supplied from one power supply terminal through one power supply motor brush and is commutated by one commutator piece, to a coil of a stator of the DC motor unit.

With such an arrangement, it is not necessary to provide a connecting element such as a connector between each power supply terminal of the sensor power supplying unit and the power supply motor brush. The current carrying structure which supplies power to the DC motor from each power supply terminal is simplified and assembly operations with the sensor power supplying unit and the DC motor are facilitated.

In a current carrying device for an EGR valve device according to the present invention, the coil feeding unit motor brushes are arranged in the DC motor unit.

With such an arrangement, the coil feeding motor brushes can be assembled into the DC motor unit in an assembly process for the DC motor which is separate from the assembly process for the sensor power supplying unit. It is possible to treat the coil power supply motor brushes as integrated with the DC motor. Assembly operations of the sensor power supplying unit and the DC motor are facilitated. The current carrying structure to the DC motor is simplified.

In a current carrying device for an EGR valve device according to the present invention, the coil feeding unit motor brushes are arranged in the sensor power supplying unit.

With such an arrangement, assembly operations of the sensor power supplying unit and the DC motor are facilitated and the current carrying structure to the DC motor is simplified.

A current carrying device for an EGR valve device according to the present invention further comprises coil feeding connection means, which is arranged between the sensor power supplying unit and the DC motor unit, for supplying a current commutated by each commutator piece from the sensor power supplying unit to the corresponding coil of the stator of the DC motor unit through the corresponding slip ring and the corresponding coil feeding motor brush connected to the commutator piece.

With such an arrangement, it is possible to assemble the power supply motor brushes and the coil power supply motor brushes in an integrated manner into the sensor power supplying unit during the assembly process of the sensor power supplying unit. It is possible to treat the power supply motor brushes and the coil power supply motor brushes as integrated with the sensor power supplying unit. Assembly operations of the sensor power supplying unit and the DC motor are facilitated and the current carrying structure to the DC motor is simplified.

In a current carrying device for an EGR valve device according to the present invention, the power supply motor brushes are arranged at positions of the sensor power supplying unit, the tip of each power supply motor brush abuts perpendicularly with the corresponding commutator piece of the disk-shaped feeding unit of the DC motor unit in a state that the sensor power supplying unit is assembled into the DC motor unit, the coil feeding motor brushes are arranged at positions of the sensor power supplying unit, and the tip of each coil feeding motor brush abuts perpendicularly with the corresponding slip ring of the disk-shaped feeding unit of the DC motor unit in a state that the sensor power supplying unit is assembled into the DC motor unit.

With such an arrangement, since the commutator pieces and the slip rings are formed on the disk-shaped feeding unit, the surface contacting each power supply motor brush and the corresponding coil feeding motor brush can be increased. Thus it is possible to increase the interval between each power supply motor brush and the corresponding coil power supply motor brush formed on the sensor power supplying unit. Arrangement of the coil power supply motor brushes and the power supply motor brushes is facilitated. The power supply motor brushes and the coil feeding motor brushes are formed on the sensor power supplying unit. Each coil power supply motor brush is connected with the coil of the stator of the DC motor by the coil power supply connection means. Thus the current carrying structure supplying electrical power from each power supply terminal to the DC motor is simplified and assembly operations of the sensor power supplying unit and the DC motor are facilitated.

In a current carrying device for an EGR valve device according to the present invention, the power supply motor brushes are arranged at positions of the sensor power supplying unit, the tip of each power supply motor brush abuts perpendicularly with the corresponding commutator piece of the ring-shaped feeding unit of the DC motor unit in a state that the sensor power supplying unit is assembled into the DC motor unit, the coil feeding motor brushes are arranged at positions of the sensor power supplying unit, and the tip of each coil feeding motor brush abuts perpendicularly with the corresponding slip ring of the ring-shaped feeding unit of the DC motor unit in a state that the sensor power supplying unit is assembled into the DC motor unit.

With such an arrangement, since the commutator pieces and the slip rings are formed on the ring-shaped feeding unit, the surface contacting each power supply motor brush and the corresponding coil feeding motor brush can be increased. Thus it is possible to increase the interval between each power supply motor brush and the corresponding coil power supply motor brush formed on the sensor power supplying unit. Arrangement of the coil power supply motor brushes and the power supply motor brushes is facilitated. The power supply motor brushes and the coil feeding motor brushes are formed on the sensor power supplying unit. Each coil power supply motor brush is connected with the coil of the stator of the DC motor by the coil power supply connection means. Thus the current carrying structure supplying electrical power from each power supply terminal to the DC motor is simplified and assembly operations of the sensor power supplying unit and the DC motor are facilitated.

DETAILED DESCRIPTION OF THE PREFERRED EMBODIMENTS

The invention will now be described with reference to the accompanying drawings.
Embodiment 1

Figure 4:
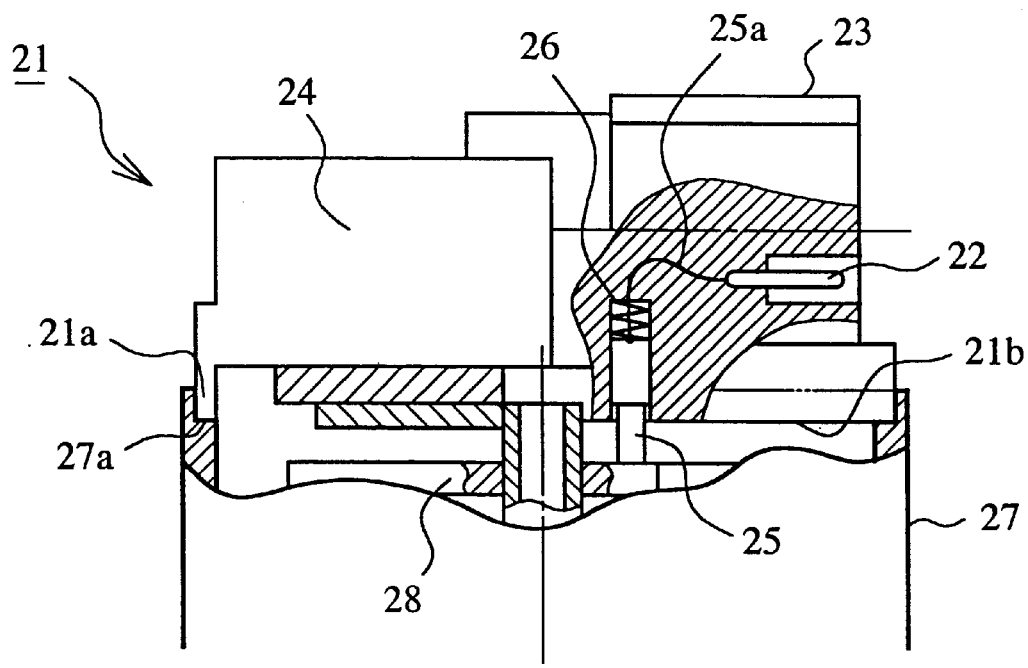
FIG. 4 is a partial cross sectional view of the structure of a commutator and motor brushes and the like in a current-carrying device of an EGR valve device according to a first embodiment of the present invention.

FIG. 4 is a partial cross sectional view of the structure of a commutator, motor brushes and the like of a current carrying device of an EGR valve device according to a first embodiment of the present invention. In the figures, 21 denotes a sensor power supplying unit which supplies power to a sensor (not shown) in order to detect a valve position and a DC motor unit. 22 denotes a motor power supply terminal (power supply terminal) which supplies power to the DC motor unit. A sensor power supplying unit terminal (not shown), which supplies power to the sensor in order to detect a valve position, is arranged in addition to the motor power supply terminal 22. 23 denotes a power supply terminal cover which covers the motor power supply terminal 22. 24 denotes an integrated sensor unit which holds the sensor. 25 denotes each of a plurality of power supply motor brushes (current carrying device) which are arranged in the sensor power supplying unit 21. 25a denotes a wire which connects each power supply motor brush 25 and the motor power supply terminal 22. 26 denotes a spring which pushes each power supply motor brush 25 towards the disk-shaped feeding unit (current carrying device) 28 which is arranged in the DC motor unit 27 and which makes contact with one commutator piece formed on the surface of the feeding unit 28.

The power supply motor brushes 25 and the commutators of the disk-shaped feeding unit 28 form a current carrying device which supplies power from the sensor power supplying unit 21 to the DC motor unit 27.

The sensor power supplying unit 21 is fitted to an upper end of the DC motor unit 27 by an abutting portion 21a tightly engaging with a fitting portion 27a of the DC motor unit 27. Each power supply motor brush 25 which is pushed towards the DC motor unit 27 by the spring 26 is fitted to the sensor power supplying unit 21 in an orientation such that the proximity of its tip projects by a fixed amount from the contact face 21b of the sensor power supplying unit 21.

Figure 5A:
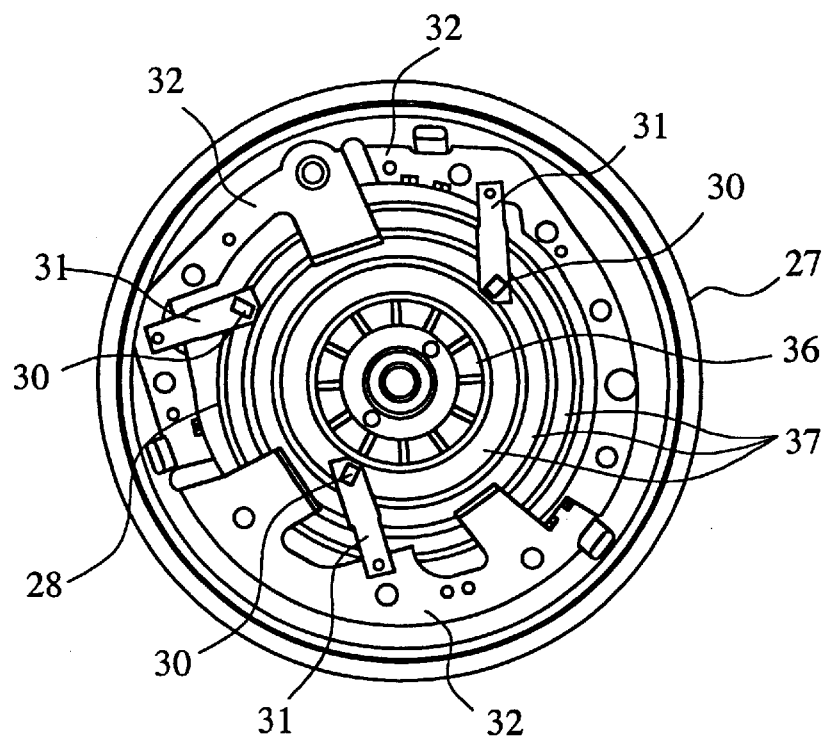
FIGS. 5A and 5B show the overall structure of a current carrying device containing motor brushes of an EGR valve device according to a first embodiment of the present invention.
Figure 5B:
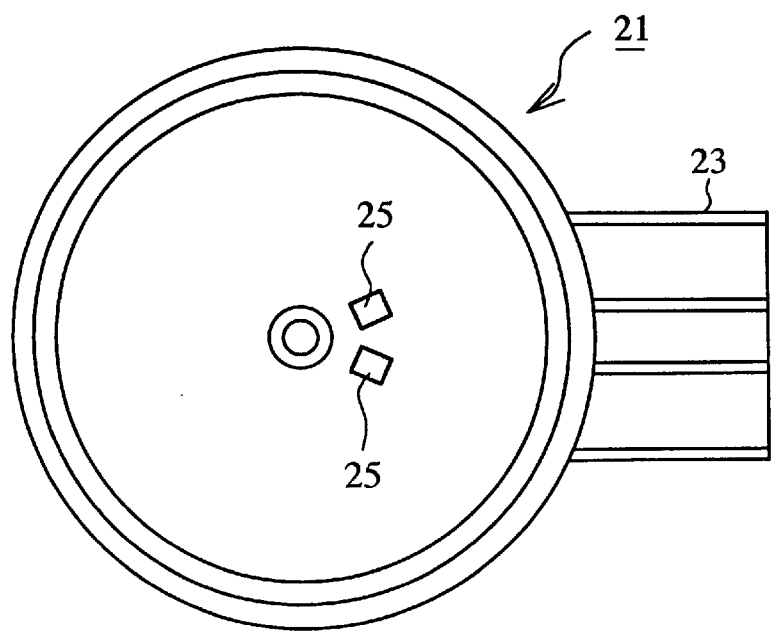

FIG. 5A and 5B show the overall structure of a current carrying device containing a plurality of power supply motor brushes 25 as shown in FIG. 4. Those components in FIG. 5A and 5B which are the same or similar to those in FIG. 4 are designated by the same reference numerals and further description will be omitted. In the figure, 36 denotes each of a plurality of commutator pieces (current carrying device) which are arranged in a concentric area proximate to the center of the disk-shaped feeding unit 28. The commutator pieces are obtained by dividing a circular plate into a fixed number of pieces and are electrically insulated from each other. 37 denotes each of a plurality of ring-shaped slip rings (current carrying device) which are formed on a plurality of concentric areas on an outer side of the commutator pieces 36 and are electrically insulated from each other. The commutator pieces 36 and slip rings 37 are connected by a fixed connection structure.

30 denotes each of a plurality of coil feeding motor brushes (current carrying device). Each coil feeding motor brush 30 supplies a DC current, which is supplied from the motor power supply terminal 22 through one power supply motor brush 25 and is commutated by one commutator piece 36 of the disk-shaped feeding unit 28, to one coil of a stator (not shown) through a slip ring 37 formed on the disk-shaped feeding unit 28.

31 denotes each of a plurality of motor brush pressing plate spring members. Each coil feeding motor brush 30 is tightly fitted to one face of a tip of one motor brush pressing plate spring member 31. 32 denotes each of a plurality of brush retaining plates. the base of each motor brush pressing plate spring member 31 is fixed to one brush retaining plate 32 by caulking, welding or the like. The brush retaining plates 32 are arranged in the DC motor unit 27 so as to be electrically insulated from each other. As a result, the motor brush pressing plate spring members 31, which have these coil feeding motor brushes 30 and are electrically insulated from each other, are arranged on the periphery of the disk-shaped feeding unit 28. Each plate spring member 31 extends from above the disk-shaped feeding unit 28 to a fixed position on one commutator piece 36 or one slip ring 37 formed on the surface of the disk-shaped feeding unit 28. The coil feeding motor brush 30 fixed on the tip of each plate spring member 31 is pushed down onto the surface of the slip ring 37 or the commutator piece 36 and is pressed in a sliding manner.

The operation of the current carrying device of the EGR valve device will be described below.

In this EGR valve device, the abutting portion 21a of the sensor power supplying unit 21 is tightly engaged with the fitting portion 27a of the DC motor unit 27, and the sensor power supplying unit 21 is fitted to the top end of the DC motor unit 27. The tip of the power supply motor brush 25 which is fitted to the sensor power supplying unit 21 and which projects by a fixed amount from the abutting face 21b of the sensor power supplying unit 21 is pushed by the spring 26 and contacts with the commutator pieces 36 of the disk-shaped feeding unit 28. Thus in view of the positional relationship of the power supply motor brush 25 and the coil feeding motor brush 30, the sensor power supplying unit 21 is fitted to the DC motor unit 27.

An electric current is supplied to one commutator piece 36 of the disk-shaped feeding unit 28 from the power supply terminal 22 through the power supply motor brush 25 which contacts with the commutator piece 36. The electric current is commutated in the commutator piece 36, passes through one slip ring 37 connected with the commutator piece 36 and is supplied to one coil of the stator of the DC motor unit 27 through one coil feeding motor brush 30 arranged on the DC motor unit 27.

Figure 1:
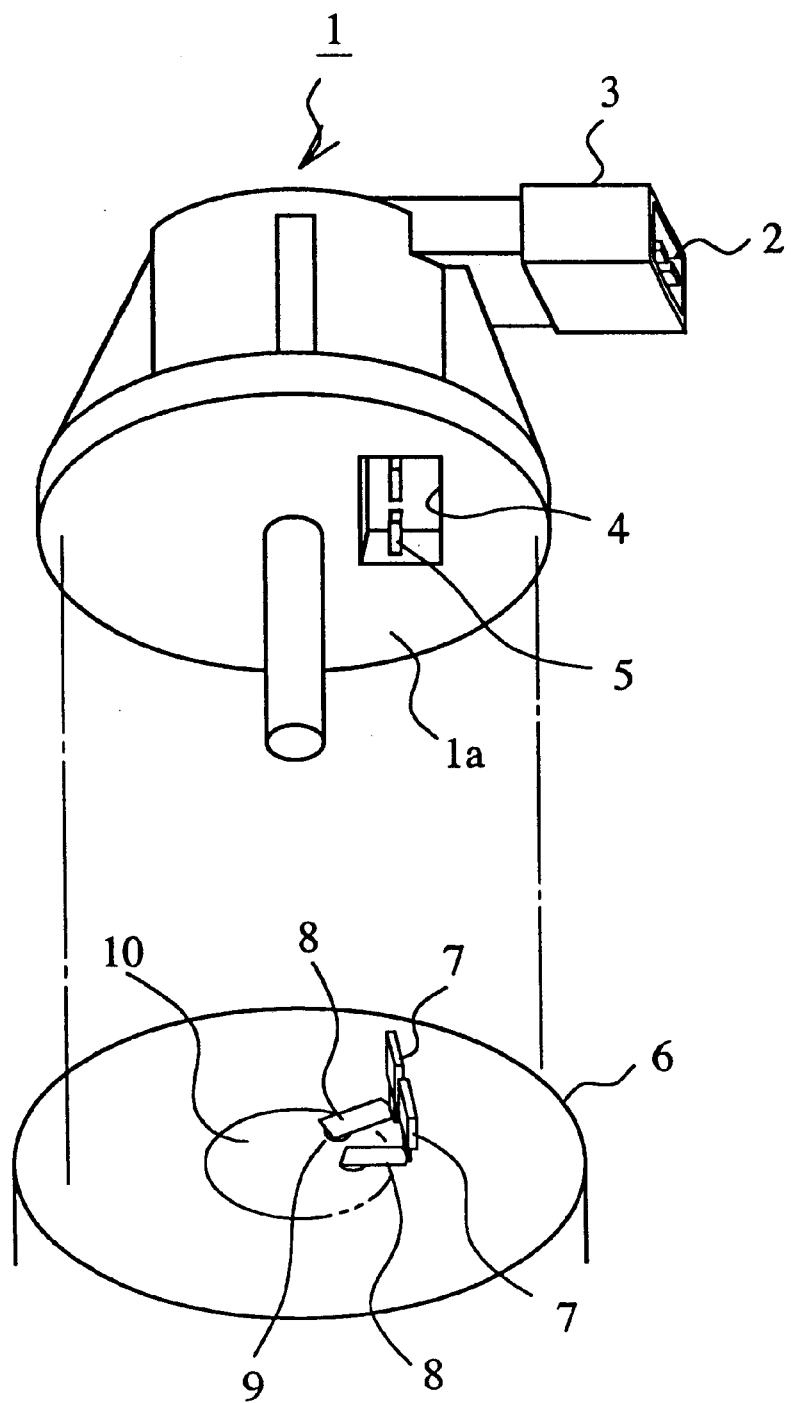
FIG. 1 is a partial perspective view of the structure of a current carrying device of a conventional EGR valve device.
Figure 2:
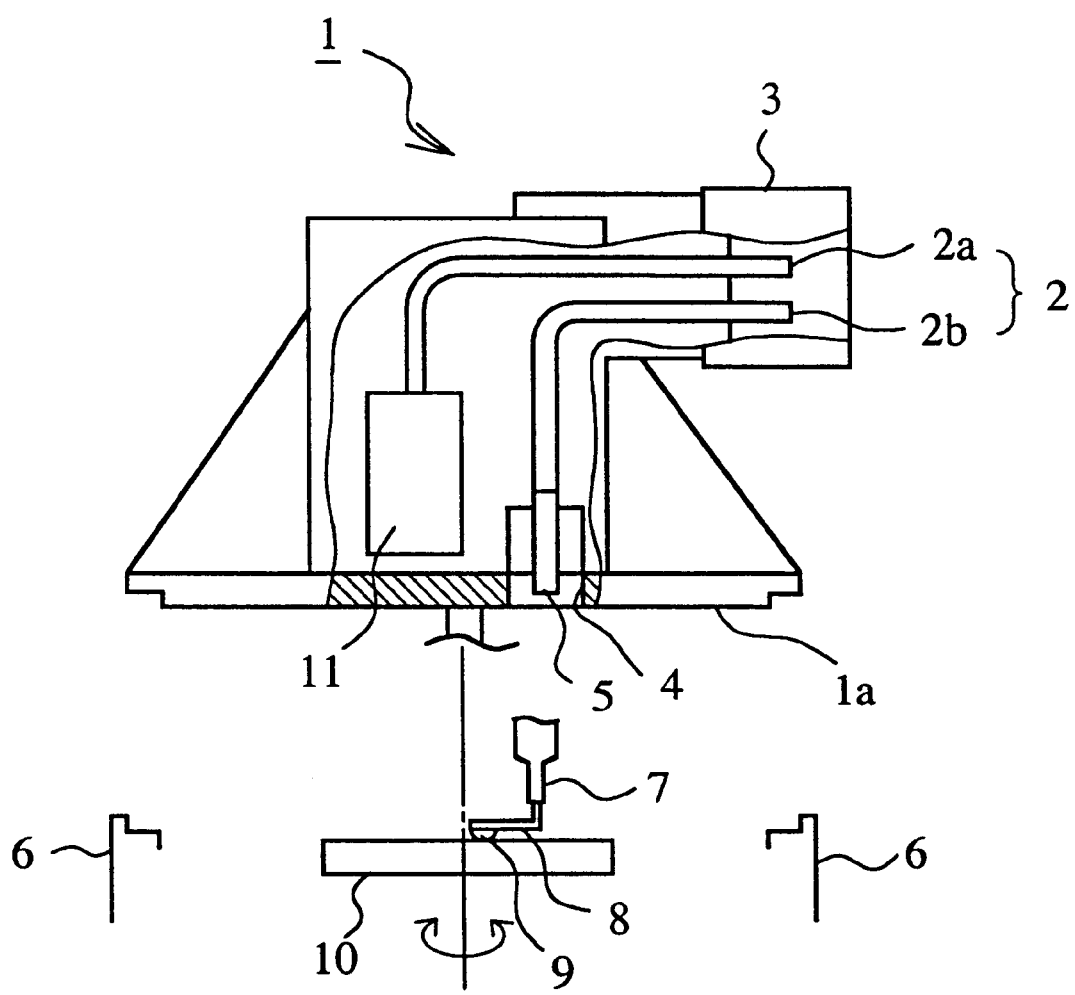
FIG. 2 is a partial longitudinal cross section of the structure of a current carrying device as shown in FIG. 1 of a conventional EGR valve device.
Figure 3A:
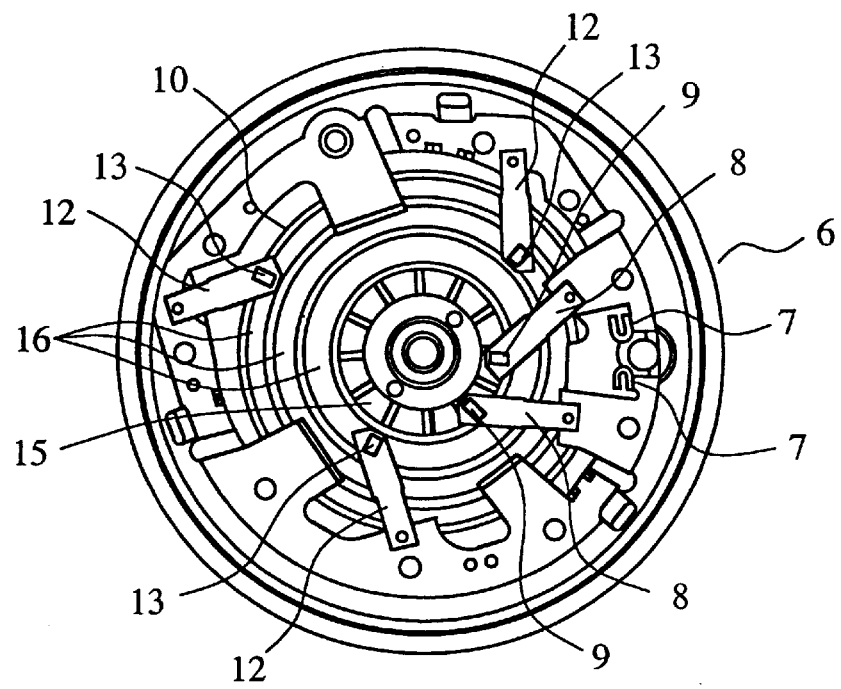
FIG. 3A and 3B show the structure of a current carrying device in a conventional EGR valve device providing a disk-shaped commutator as a commutator and provided with coils of the stator.
Figure 3B:
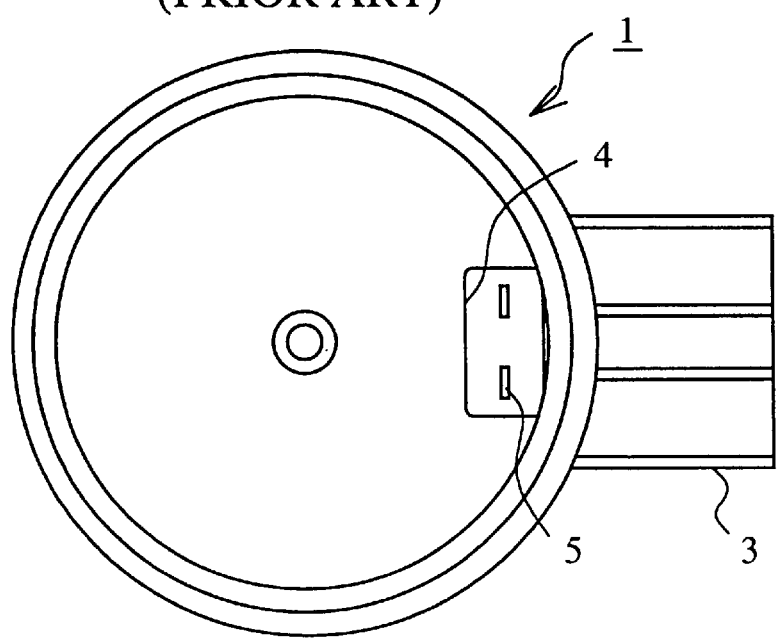

Accordingly, when a sensor power supplying unit 21 is fitted to the DC motor unit 27, it is not necessary to engage the connecting terminal 5 of the sensor power supplying unit 1 as shown in the conventional example in FIG. 1 with the receiving connector 7 of the DC motor unit 6. That is to say, the assembly operations for the sensor power supplying unit 21 onto the DC motor unit 27 are facilitated. Furthermore since the connecting terminal 5 and the receiving connector 7 in the conventional example are not required, the current carrying structure is simplified since power is supplied to the DC motor unit 27 through one slip ring 37 and one commutator piece 36 of the disk-shaped feeding unit 28.

Since the commutator pieces 36 are formed on a surface of the disk-shaped feeding unit 28, the surface area of each commutator piece 36 which can come into contact with one power supply motor brush 25 is increased. As a result, it is possible to increase the interval at which the power supply motor brushes 25 formed on the sensor power supplying unit 21 are arranged. The arrangement of the power supply motor brushes 25 is facilitated and the tip of each power supply motor brush 25 can abut and contact with the surface of one commutator piece 36 of the disk-shaped feeding unit 28 from above. Therefore the current carrying structure supplying current to each commutator piece 36 of the disk-shaped feeding unit 28 from the motor power supply terminal 22 can be simplified. Furthermore assembly operations of the sensor power supplying unit 21 and the DC motor unit 27 are simplified.

Each coil feeding motor brush 30 which is tightly fitted to one motor brush pressing plate spring member 31 can be assembled onto the DC motor unit 27 during the assembly process of the DC motor unit 27 in an assembly process which is separated from that of the sensor power supplying unit 21. Thus the coil feeding motor brushes 30 and the DC motor unit 27 can be treated as a single component. Therefore assembly operations of the sensor power supplying unit 21 and the DC motor unit 27 are facilitated.

In such a way according to the first embodiment, a current carrying device for an EGR valve is obtained which dispenses with the connection terminal 5 of the sensor power supplying unit and the receiving connector 7 of the DC motor unit required in the conventional example. Furthermore it is not required to perform connection of the connector in each power supply motor brush 25 in contradistinction to the conventional example when assembling from the sensor power supplying unit 21 to the DC motor unit 27. It is possible to simplify the current carrying structure for supplying a current to the DC motor unit 27. The assembly of the sensor power supplying unit 21 into the DC motor unit 27 is simplified.

Embodiment 2

Figure 6:
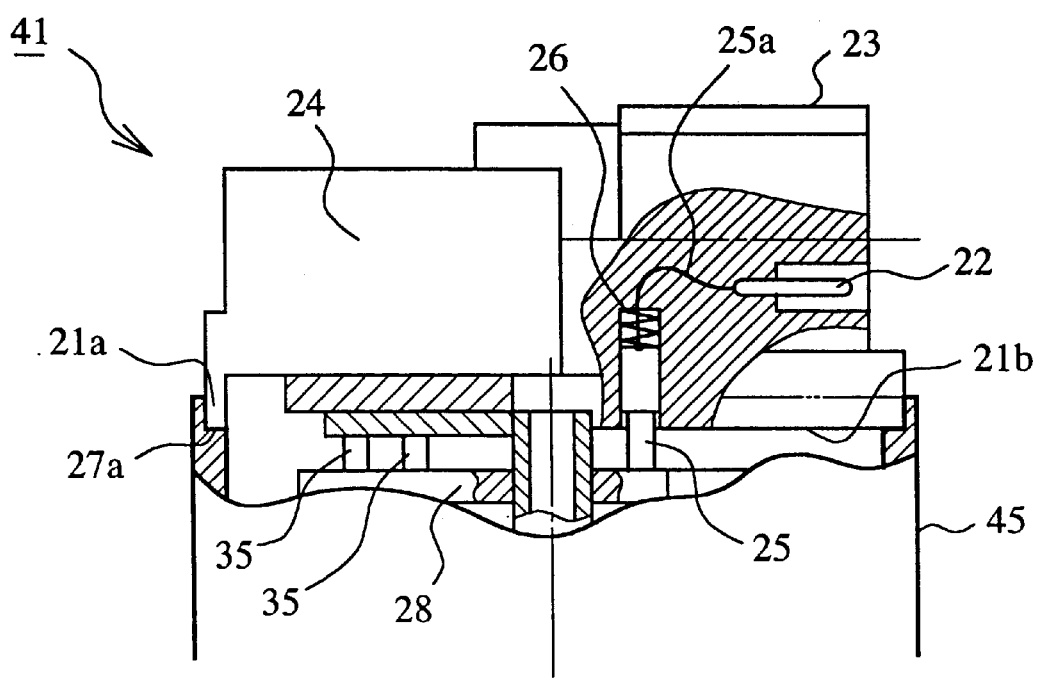
FIG. 6 is a partial cross sectional view showing the structure of a current-carrying device of an EGR valve device according to a second embodiment of the present invention.

FIG. 6 is a partial cross section of the structure of a plurality of motor brushes and a commutator and the like in a current carrying device for an EGR valve device according to a second embodiment of the present invention. In FIG. 6, those components which are the same or similar to those in FIG. 4 are designated by the same numerals and further description will be omitted. In the figure, reference numeral 41 denotes a sensor power supplying unit which supplies power to a sensor (not shown) in order to detect a valve position and DC motor unit. 35 denotes each of a plurality of coil feeding motor brushes (current carrying device) which are arranged in the sensor power supplying unit 41.

Each coil feeding motor brush 35 supplies a DC current, which is supplied from the motor power supply terminal 22 through the power supply motor brushes 25 and is commutated by one commutator piece of the disk-shaped feeding unit 28, to the coil of a stator (not shown) through one slip ring. Each coil feeding motor brush 35 is pushed towards the DC motor unit 45 by a spring 26 (not shown) in the same way as the power supply motor brushes 25. When the sensor power supplying unit 41 is fitted to the DC motor unit 45, each coil feeding motor brush 35 is fitted to the sensor power supplying unit 41 so that the tip of the coil feeding motor brush 35 abuts slidably with the surface of one slip ring of the disk-shaped feeding unit 28.

Figure 7A:
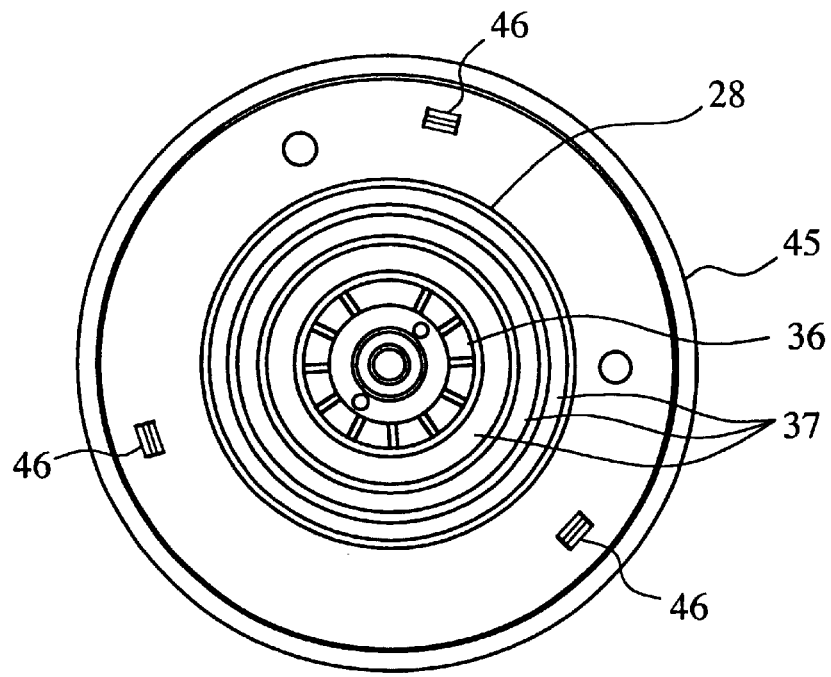
FIGS. 7A and 7B show the structure of a current-carrying device of an EGR valve device according to a second embodiment of the present invention.
Figure 7B:
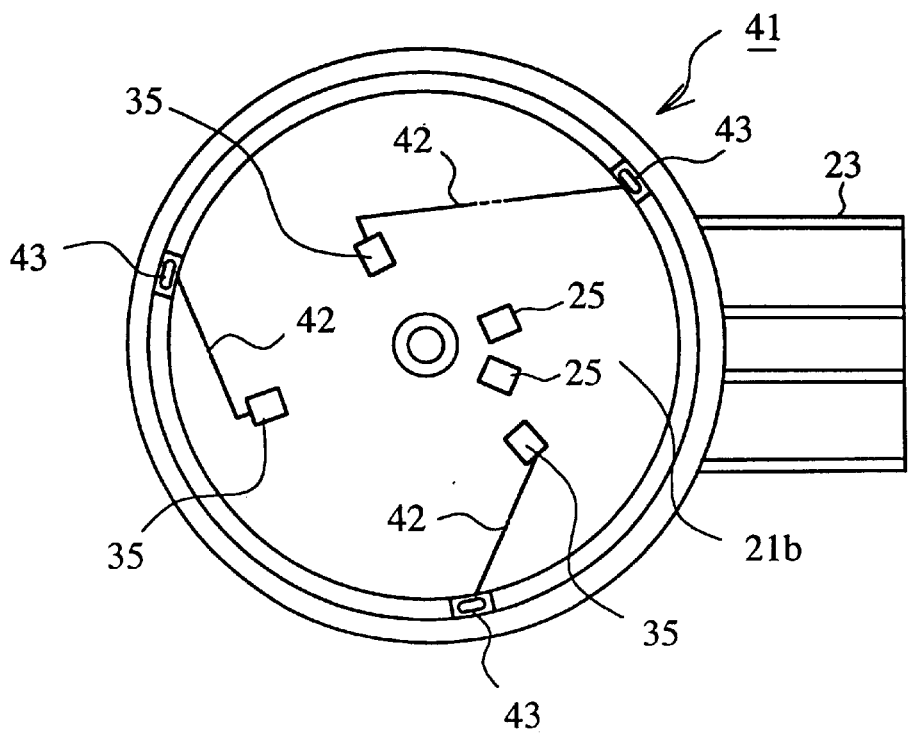

FIG. 7A and 7B show the structure of slip rings and commutator pieces of the disk-shaped feeding unit 28 of the DC motor unit 45 in a current-carrying device as shown in FIG. 6 and show the arrangement of the connections of the coil feeding motor brushes and power supply motor brushes of the sensor power supplying unit 41. Those components which are the same or similar to those in FIG. 6 are designated by the same numerals and further description will be omitted.

In the figure, reference numeral 43 denotes each of a plurality of coil feeding terminals which are arranged on a peripheral edge of the fitting face 21b of the sensor power supplying unit 41. Each coil feeding terminal 43 is connected by a wire 42 and each corresponding coil feeding motor brush 35. 46 denotes each of a plurality of receiving connectors. Each receiving connector 46 is arranged at a position on the opposite face to one coil feeding terminal 43 on the periphery of the disk-shaped feeding unit 28 of the DC motor unit 45. Each receiving connector 46 is connected to one coil of the stator (not shown) of the DC motor unit 45. Each receiving connector 46 is tightly engaged with one coil feeding terminal 43 of the sensor power supplying unit 41 and is electrically connected in a state in which the sensor power supplying unit 41 is fitted to the DC motor unit 45.

The operation of the EGR valve device will be described below.

In this type of EGR valve device, an abutting portion 21a shown in FIG. 6 is tightly inserted into the fitting portion 27a of the DC motor unit 45, and the sensor power supplying unit 41 is fitted to the upper end of the DC motor unit 45. In this case, the power supply motor brushes 25 and the coil feeding motor brushes 35 are fitted to the sensor power supplying unit 41. Thus it is possible to assemble the coil feeding motor brushes 35 and the power supply motor brushes 25 onto the sensor power supplying unit 41 in the assembly process of the sensor power supplying unit 41. Thus the assembly process of the motor brushes in the current carrying device is facilitated.

When the sensor power supplying unit 41 is fitted to the DC motor unit 45, the tip of one power supply motor brush 25, which projects by a fixed amount from the abutting face 21b placed between the sensor power supplying unit 41 and the DC motor unit 45, is pushed by a spring 26 and makes contact with the face of one commutator piece 36 of the disk-shaped feeding unit 28. Furthermore the tip of one coil feeding motor brush 35 is pushed by the spring 26 and contacts with the face of one slip ring 37 of the disk-shaped feeding unit 28.

A current is supplied from the power supply terminal 22 to the disk-shaped feeding unit 28 through the power supply motor brush 25 which contacts with the commutator piece 36 of the disk-shaped feeding unit 28. The current is commutated by the commutator piece 36 of the disk-shaped feeding unit 28 and passes through the slip ring 37 connected with the commutator piece 36, and the commutated current is supplied to the coil of the stator of the DC motor unit 45 through one receiving connector 46, one coil feeding terminal 43 and the coil feeding motor brush 35.

In this way, the coil feeding motor brushes 35 and the power supply motor brushes 25 of the current carrying device are all fitted to the sensor power supplying unit 41 and thus it is possible to complete the assembly of the power supply motor brushes 25 and the coil feeding motor brushes 35 in the assembly operation of the sensor power supplying unit 41.

After the sensor power supplying unit 41 and the DC motor unit 45 are assembled in respectively different assembly operations, when the sensor power supplying unit 41 is fitted to the DC motor unit 45, each receiving connector 46 of the DC motor unit 45 and the corresponding coil feeding terminal 43 of the sensor power supplying unit 41 may simply be fitted to each other. Furthermore, it is not necessary that the sensor power supplying unit 41 is fitted to the DC motor unit 45 in consideration of the positional relationship between each power supply motor brush 25 and the corresponding coil feeding motor brush 35. As a result, the fitting operation of the sensor power supplying unit 41 to the DC motor unit 45 is facilitated, and the current carrying structure for supplying a current to the DC motor unit 45 through the commutator pieces 36 of the disk-shaped feeding unit 28 and the slip rings 37 is simplified.

Furthermore the disk-shaped feeding unit 28 has a greater surface area which can contact with each coil feeding motor brush 35 and each power supply motor brush 25. As a result, the interval between the coil feeding motor brush 35 and the power supply motor brush 25 formed on the sensor power supplying unit 41 can be enlarged. The arrangement of the power supply motor brushes 25 and the coil feeding motor brushes 35 is facilitated. It is possible to simplify the current carrying structure supplying current from the motor power supply terminal 22 to the DC motor unit 45 and facilitate the assembly operation of the sensor power supplying unit 41 and the DC motor unit 45.

It is possible to integrate the assembly of the power supply motor brushes 25 and the coil feeding motor brushes 35 onto the sensor power supplying unit 41 in the assembly process of the sensor power supplying unit 41 and to treat the power supply motor brushes 25 and the coil feeding motor brushes 35 as integrated with the sensor power supplying unit 41. Thus the assembly operation of the sensor power supplying unit 41 and the DC motor unit 45 is facilitated. The tip of each power supply motor brush 25 can abut and contact with the surface of the commutator piece 36 of the disk-shaped feeding unit 28 from above. The tip of each coil feeding motor brush 35 can also abut and contact with the surface of the slip ring 37 of the disk-shaped feeding unit 28 from above. Thus the current carrying structure to the DC motor unit 45 is simplified.

As shown above according to the second embodiment, a current carrying device for an EGR valve device is obtained in which all power supply motor brushes 25 and the coil feeding motor brushes 35 are arranged in the sensor power supplying unit 41 and adapted so that each power supply motor brush 25 and each coil feeding motor brush 35 contact with the corresponding slip ring 37 and the corresponding commutator piece 36 of the disk-shaped feeding unit 28. Furthermore since a connector connection is not required in the motor brushes when assembling the sensor power supplying unit 41 and the DC motor unit 45, it is possible to simplify the current carrying structure for supplying current to the DC motor unit 27. The assembly operations of the power supply motor brushes 25 and the coil feeding motor brushes 35 and the assembly operations of the sensor power supplying unit 41 onto the DC motor unit 45 are simplified.

Embodiment 3

Figure 8:
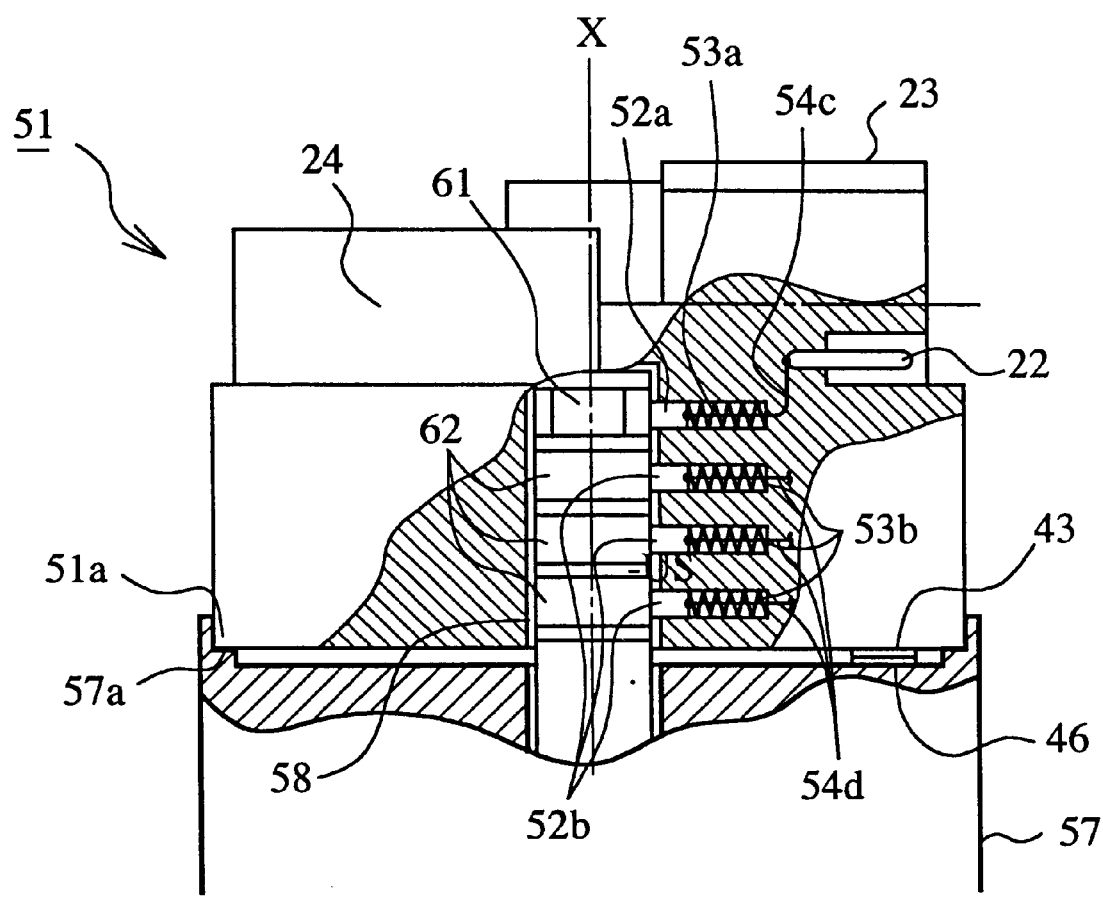
FIG. 8 is a partial cross sectional view showing the structure of a current-carrying device of an EGR valve device according to a third embodiment of the present invention.

FIG. 8 is a partial cross sectional view showing the structure of motor brushes and commutator in a current-carrying device of an EGR valve device according to a third embodiment of the present invention. In FIG. 8, those components which are the same or similar to those in FIG. 4 are designated by the same numerals and further description will be omitted. In the figure, reference numeral 51 denotes a sensor power supplying unit which supplies power to a sensor (not shown) in order to detect a DC motor unit and valve position. 51a denotes an abutting portion of the sensor power supplying unit 51 when the sensor power supplying unit 51 is fitted to the DC motor unit 57. 51b denotes a fitting face, and the sensor power supplying unit 51 and the DC motor unit 57 is fitted to each other through the fitting face 51b. A coil feeding terminal (coil feeding connection means) 43 is provided as shown in FIG. 7A and 7B.

52a denotes each of a plurality of power supply motor brushes (current carrying device). A tip of each power supply motor brush 52a abuts on a peripheral face of a corresponding commutator piece (current carrying device) 61 formed on a ring-shaped feeding unit (current carrying device) 58 which is fitted to a rotational axis of a rotor (not shown) of the DC motor unit 57. 52b denotes each of a plurality of coil feeding motor brushes (current carrying device). A tip of each coil feeding motor brush 52b abuts on a peripheral face of a corresponding ring-shaped slip ring (current carrying device) 62 formed on the ring-shaped feeding unit (current carrying device) 58. 54c denotes a wire which connects each power supply motor brush 52a and the corresponding motor power supply terminal 22. 53a denotes each of a plurality of springs. Each spring 53a pushes one power supply motor brush 52a toward the peripheral face of the corresponding commutator piece 61 of the ring-shaped feeding unit 58 arranged in the DC motor unit 57 so as to make the power supply motor brush 52a contact with the commutator piece 61. 53b denotes each of a plurality of springs. Each spring 53b pushes one coil feeding motor brush 52b toward a peripheral face of the corresponding slip ring 62 of the ring-shaped feeding unit 58 arranged in the DC motor unit 57 so as to make the coil feeding motor brush 52b contact with the slip ring 62.

There are two power supply motor brushes 52a although only one is shown in FIG. 8. The power supply motor brushes 52a are connected with different motor power supply terminals 22 respectively, and the tips of the power supply motor brushes 52a abut with the commutator pieces 61 of the ring-shaped feeding unit 58 respectively at different positions.

As shown in FIG. 8, there are three coil feeding motor brushes 52b. Furthermore the slip rings 62 are formed in three stages in direction x on the central axis of the ring-shaped feeding unit 58. Each coil feeding motor brush 52b is connected by a lead line 54d with a corresponding coil feeding terminal 43 formed on the fitting face 51b of the sensor power supplying unit 51, and a tip of the coil feeding motor brush 52b abuts with the corresponding slip ring 62 of the ring-shaped feeding unit 58.

Furthermore a plurality of receiving coils (coil feeding connection means) as shown in FIG. 7A and 7B are formed in the DC motor unit 57 so as to tightly fit to the coil feeding terminals 43 formed on the fitting face 51b of the sensor power supplying unit 51.

57a denotes a fitting portion of the DC motor unit 57, and the sensor power supplying unit 51 is fitted to the DC motor unit 57 through the fitting portion 57a. When the abutting portion 51a of the sensor power supplying unit 51 is tightly inserted into the fitting portion 57a of the DC motor unit 57, the sensor power supplying unit 51 is fitted to an upper end of the DC motor unit 57. The coil feeding motor brushes 52b pushed by the springs 53b and the power supply motor brushes 52a pushed by the springs 53a are fitted to the sensor power supplying unit 51 so that their tips of the motor brushes 52a and 52b abut vertically with respect to the peripheral faces of the commutator pieces 61 and the slip rings 62 of the ring-shaped feeding unit 58.

In such a way, a ring-shaped commutator 58 is formed by the slip rings 62 electrically insulated from each other and the commutator pieces 61 electrically insulated from each other.

The commutator pieces 61 are obtained by dividing a ring-shaped conductor into a fixed number of pieces in a peripheral direction, and the commutator pieces 61 are electrically insulated from each other. The tips of the power supply motor brushes 52a abut with the commutator pieces 61, respectively, at different positions.

The slip rings 62 are formed of three ring-shaped conductors which are arranged along the rotational axis of the rotor and which are electrically insulated from each other. The tip of each coil feeding motor brush 52b abuts with the peripheral face of the corresponding slip ring 62. Each commutator piece 61 and the corresponding slip ring 62 are connected with each other by a fixed connection.

The operation of the EGR valve device will be described below.

In this EGR valve device, the sensor power supplying unit 51 is fitted to an upper end of the DC motor unit 57 through the fitting portion 51a. The power supply motor brushes 52a and the coil feeding motor brushes 52b are all fitted in the sensor power supplying unit 51. Thus it is possible to assemble the power supply motor brushes 52b and the power supply terminal motor brushes 52a onto the sensor power supplying unit 51 in the assembly operation of the sensor power supplying unit 51. Thus assembly operations of the motor brushes in the current carrying device are simplified.

When the sensor power supplying unit 51 is fitted to an upper end of the DC motor unit 57, each coil feeding terminal 43 of the sensor power supplying unit 51 is fitted to the corresponding receiving connector 46 of the DC motor so as to be tightly inserted into the receiving connector 46. When the sensor power supplying unit 51 is fitted to the DC motor unit 57, the tip of each power supply motor brush 52a abuts with the corresponding commutator piece 61 of the ring-shaped feeding unit 58. The tip of each coil feeding motor brush 52b abuts with a peripheral face of the corresponding slip ring 62 of the ring-shaped feeding unit 58.

A current is supplied from one power supply terminal 22 to the ring-shaped feeding unit 58 through the corresponding power supply motor brush 52a which is in contact with one commutator piece 61 of the ring-shaped feeding unit 58, and the current is commutated in the commutator piece 61 of the ring-shaped feeding unit 58 and passes through the slip ring 61 which is connected with the commutator piece 61. Thereafter, the commutated current is supplied to the corresponding coil of the stator of the DC motor unit 57 through one corresponding coil feeding motor brush 52b, one corresponding coil feeding terminal 43 and one corresponding receiving coil 46.

In this third embodiment, the power supply motor brushes 52a and the coil feeding motor brushes 52b of the current carrying device are all arranged in the sensor power supplying unit 51. Thus the assembly of the power supply motor brushes 52a and the coil feeding motor brushes 52b can be completed in the assembly operation of the sensor power supplying unit 51. After the assembly of the sensor power supplying unit 51 and the DC motor unit 57 is completed in respectively different assembly operations, when the sensor power supplying unit 51 is fitted to the DC motor unit 57, each receiving connector 46 of the DC motor unit 57 may simply be inserted into the corresponding coil feeding terminal 43 of the sensor power supplying unit 51. As a result, the assembly operation of the sensor power supplying unit 51 onto the DC motor unit 57 is facilitated, and the current carrying structure for supplying a current to the DC motor unit 57 through each of the commutator pieces 61 and the corresponding slip ring 62 of the ring-shaped feeding unit 58 is simplified.

Furthermore since the contact face between the tip of each power supply motor brush 52a and the corresponding commutator piece 61 of the ring-shaped feeding unit 58 and the contact face between the tip of each coil feeding motor brush 52b and the corresponding slip ring 62 become hollow, the contact surface area between the tip of the power supply motor brush 52a and the commutator piece 61 and the contact surface area between the coil feeding motor brush 52b and the slip ring 62 are large in comparison with the case when the contact faces are flat. Thus the electrical contact resistance in the tip of each power supply motor brush 52a and the electrical contact resistance in the tip of each coil feeding motor brush 52b are reduced.

It is possible to integrate the assembly of the power supply motor brushes 52a and the coil feeding motor brushes 52b onto the sensor power supplying unit 51 in the assembly process of the sensor power supplying unit 51 and to treat the power supply motor brushes 52a and the coil feeding motor brushes 52b as integrated with the sensor power supplying unit 51. Thus the assembly operation of the sensor power supplying unit 51 and the DC motor unit 57 is facilitated, and the current supply structure to the DC motor unit 57 is simplified.

As shown above, in a current carrying device of the EGR valve device as defined by the present invention, motor brushes are arranged in a sensor power supplying unit which has a sensor, and each motor brush supplies a current to a DC motor unit through a commutator and a slip ring. Thus assembly operations are facilitated, the current carrying structure to the DC motor unit is simplified and reliability is improved.

What is claimed is:

1. A current carrying device for a motor, in which an electrical current is supplied from a sensor power supplying unit with a sensor detecting a valve position to a DC motor unit acting as a drive source for a valve, comprising:
   a plurality of power supply motor brushes assembled on the sensor power supplying unit, each power supply motor brush being connected with a power supply terminal of the sensor power supplying unit and being in contact with a commutator piece of a feeding unit arranged in the DC motor unit; and
   a plurality of coil feeding unit motor brushes, each of which is in contact with a slip ring of the feeding unit, for respectively supplying a current, which is supplied from one power supply terminal through one power supply motor brush and is commutated by one commutator piece, to a coil of a stator of the DC motor unit.

2. A current carrying device for a motor according to claim 1, wherein the coil feeding unit motor brushes are arranged in the DC motor unit.

3. A current carrying device for a motor according to claim 1, wherein the coil feeding unit motor brushes are arranged in the sensor power supplying unit.

4. A current carrying device for a motor according to claim 3, further comprising:

coil feeding connection means, which is arranged between the sensor power supplying unit and the DC motor unit, for supplying a current commutated by each commutator piece from the sensor power supplying unit to the corresponding coil of the stator of the DC motor unit through the corresponding slip ring and the corresponding coil feeding motor brush connected to the commutator piece.

5. A current carrying device for a motor according to claim 4, wherein the feeding unit comprises a disk-shaped feeding unit which rotates together with a rotor of the DC motor unit, the power supply motor brushes are arranged at positions of the sensor power supplying unit, the tip of each power supply motor brush abuts perpendicularly with the corresponding commutator piece of the disk-shaped feeding unit of the DC motor unit in a state that the sensor power supplying unit is assembled into the DC motor unit, the coil feeding motor brushes are arranged at positions of the sensor power supplying unit, and the tip of each coil feeding motor brush abuts perpendicularly with the corresponding slip ring of the disk-shaped feeding unit of the DC motor unit in a state that the sensor power supplying unit is assembled into the DC motor unit.

6. A current carrying device for a motor according to claim 4, wherein the feeding unit comprises a ring-shaped feeding unit which rotates together with a rotor of the DC motor unit, the power supply motor brushes are arranged at positions of the sensor power supplying unit, the tip of each power supply motor brush abuts perpendicularly with the corresponding commutator piece of the ring-shaped feeding unit of the DC motor unit in a state that the sensor power supplying unit is assembled into the DC motor unit, the coil feeding motor brushes are arranged at positions of the sensor power supplying unit, and the tip of each coil feeding motor brush abuts perpendicularly with the corresponding slip ring of the ring-shaped feeding unit of the DC motor unit in a state that the sensor power supplying unit is assembled into the DC motor unit.

* * * * *